United States Patent
Jones

[11] Patent Number: 5,947,254
[45] Date of Patent: Sep. 7, 1999

[54] SHAFT LOCKING DEVICE

[75] Inventor: Richard Jones, New Hall, United Kingdom

[73] Assignee: Black & Decker Inc., Newark, Del.

[21] Appl. No.: 08/807,091

[22] Filed: Feb. 27, 1997

[30] Foreign Application Priority Data

Mar. 2, 1996 [GB] United Kingdom .................... 9604553

[51] Int. Cl.$^6$ ................................................ F16D 51/00
[52] U.S. Cl. ...................... 192/223.2; 192/30 V
[58] Field of Search .................. 192/7, 8 R, 38, 192/30 V, 223.2; 188/82.84

[56] References Cited

U.S. PATENT DOCUMENTS

| | | |
|---|---|---|
| 2,429,900 | 10/1947 | Spraragen .............................. 192/8 R |
| 2,493,272 | 1/1950 | Spraragen et al. ................. 192/30 V X |
| 2,624,435 | 1/1953 | Stephenson . |
| 3,055,471 | 9/1962 | Warn et al. . |
| 3,243,023 | 3/1966 | Boyden . |
| 3,877,253 | 4/1975 | Yeagle . |
| 3,902,580 | 9/1975 | Johnson . |
| 3,917,036 | 11/1975 | Johnson et al. . |
| 4,187,937 | 2/1980 | Kitchin . |
| 4,344,306 | 8/1982 | Citron . |
| 4,620,806 | 11/1986 | Rabe . |
| 4,787,490 | 11/1988 | Lederman et al. . |
| 4,792,321 | 12/1988 | Lundquist .......................... 192/56.1 X |
| 4,796,728 | 1/1989 | Kanengieter et al. ............. 192/30 V X |
| 4,828,085 | 5/1989 | Lederman . |
| 4,828,086 | 5/1989 | Lederman . |
| 4,921,084 | 5/1990 | Lederman . |
| 4,971,184 | 11/1990 | Lederman . |
| 4,993,528 | 2/1991 | Lederman . |
| 5,007,514 | 4/1991 | Hattori et al. . |
| 5,014,833 | 5/1991 | Johnston . |
| 5,016,501 | 5/1991 | Holzer .................................... 81/57.11 |
| 5,129,495 | 7/1992 | Johnston et al. . |
| 5,248,017 | 9/1993 | Schwarzbich ........................... 192/8 R |
| 5,271,486 | 12/1993 | Okamoto et al. . |
| 5,276,945 | 1/1994 | Matsumura ...................... 188/82.84 X |
| 5,279,400 | 1/1994 | Riggle et al. . |
| 5,307,911 | 5/1994 | Robinson . |
| 5,355,748 | 10/1994 | Ito et al. . |
| 5,582,276 | 12/1996 | Berteau ............................... 188/82.84 |
| 5,593,210 | 1/1997 | Schwarzbich ....................... 192/8 R X |
| 5,638,929 | 6/1997 | Park ................................ 192/30 V X |
| 5,706,700 | 1/1998 | Takagi et al. .................... 188/82.84 X |

FOREIGN PATENT DOCUMENTS

| | | |
|---|---|---|
| 0497007 | 8/1992 | European Pat. Off. . |
| 0641957 | 3/1995 | European Pat. Off. . |
| 2616498 | 12/1988 | France . |
| 2628826 | 2/1978 | Germany . |
| 4213610 | 10/1992 | Germany . |
| 1179105 | 1/1970 | United Kingdom . |

*Primary Examiner*—Rodney H. Bonck
*Attorney, Agent, or Firm*—Dennis A. Dearing; John D. Del Ponti; Bruce S. Shapiro

[57] ABSTRACT

A shaft locking device (2) enables torque applied to a drive shaft (8) to be transmitted to a driven shaft (10) via a one-way transmission system (6). Any torque applied directly to the driven shaft (10) is not transmitted via the one-way transmission system (6) to the drive shaft (8). A part of the locking mechanism (20) in the one-way transmission system (6) is formed from a compressible resilient material thereby to damp contact between components and hence enable a quiet locking device (2) to result.

14 Claims, 2 Drawing Sheets

SHAFT LOCKING DEVICE

The present invention relates to a shaft locking device and has particular, although not exclusive, relevance as a spindle-locking device in a chuck mechanism for a power drill.

One example of a spindle lock is disclosed in a U.S. Pat. No.: 5,016,501. The spindle lock comprises coaxial input and output shafts which co-operate via a one-way transmission system. The one way transmission means comprises a plurality of chambers in the region between the input and output shafts, each chamber having therewithin a roller or a ball. The purpose of the roller or ball is to be wedged between two surfaces of the one-way transmission means when an attempt is made to rotate the output shaft on its own, but to sit freely within the chamber thereby not to be wedged and hence not to provide rotation when torque is applied to the input shaft. In the case of torque being applied to the input shaft a means is provided for advancing the ball ahead of the two wedging surfaces thereby to enable the one-way transmission means to function.

A further example of a known spindle lock is disclosed for example in U.S. Pat. No. : 3,243,023. In this document the same principle is utilised as in the above example, namely that an input and output shaft co-operate via a one-way transmission means, however in this example there are two rollers per chamber, which rollers are held spaced apart by a spring mechanism therebetween. The spring mechanism between the two rollers achieves the purposes of maintaining the rollers in their wedged, or locked, positions between a circular housing and a curved cam on the output shaft. In this manner when torque is applied to the input shaft, fingers located on the shaft contact the rollers compressing the springs therebetween and urging the rollers out of their locking positions. Such a shaft locking mechanism relies on the force of the spring to urge the rollers apart in order to accomplish wedging.

Both the above types of shaft lock, however, suffer from a common disadvantage. An inherent property of such shaft locks is to have a degree of loose play within the one-way transmission system between those elements which engage with the balls or rollers to cause their wedging. By provision of this degree of loose play, the rollers (which are wedged between two surfaces within the transmission missing thereby to cause locking of the device when the output shaft is attempted to be rotated) may be forced ahead of the wedging surfaces when the transmission is driven by the input shaft and locking is not desired. Without such a degree of loose play, the device would not be able to operate and would be permanently in its locked state.

This degree of loose play tends to be perceived by the users of the devices as problematical for the following reasons: All the elements from which the transmission means are formed tend to be made of metal. This is due to the fact that hard materials are necessary in order to withstand the high forces often generated therewithin. Use of metallic elements coupled with the degree of loose play within the transmission means, leads to an audible "clicking" noise being heard by the user at times. This noise is particularly pronounced when the device as a whole is employed in a high rotation-speed power tool. If the rotational speed of the tools is rapidly decelerated, as is quite common in power tools, the input shaft stops rotating slightly before the output shaft. The inertia of the output shaft is given up to the degree of loose play within the transmission means when the elements thereof contact each other—hence the generation of noise and the "clicking" sound. This is often perceived by the user as being a fault of the device and so it is advantageous to avoid it. One of the easiest ways to avoid such a noise would be to construct the elements which make up the transmission from relatively soft elastic materials such as nylon or plastics. However, to do so would not result in an efficacious device because these materials are not able to withstand the high forces generated within the one-way transmission means, particularly when it is in its locked state.

Accordingly it is an object of the present invention to at least alleviate the above shortcomings by providing a shaft locking device comprising coaxial first and second shafts co-operable via a one-way transmission means, which transmission means permits rotation of the second shaft by the first shaft when torque is applied to the first shaft, yet prevents rotation of the second shaft (and therefore the first shaft) when torque is applied to the second shaft; the transmission means comprising a plurality of locking elements disposed around the second shaft, the elements of the plurality circumferentially sandwiched between a locking ring and a sleeve member, wherein the sleeve member when driven by the second shaft, tends to wedge the locking elements into static engagement with the locking ring; the transmission means further comprising drive means comprising a plurality of fingers longitudinally extending along the rotational axis of the first shaft, which fingers are interposed with the plurality of locking elements and circumferentially sandwiched between the locking ring and the sleeve member, such that the plurality of fingers are driven by the first shaft to act upon the plurality of locking elements to prohibit their static engagement with the locking ring, the device characterised in that one of the sleeve member, locking elements, drive means or locking ring is at least partially coated with, or formed from compressible resilient material. By forming part of the components which make up the transmission means from (or at least partially coating them with) compressible resilient material, then this compressible resilient material is able to damp down the initial impact of the components before the non-compressible non-resilient material parts of the components engage.

Preferably the compressible, resilient material is formed as an oversize portion of the one of the sleeve member, locking elements or locking ring of which it forms a part. In this manner it can be ensured that the initial contact is with the compressible resilient material before the other components engage.

Additionally, or alternatively, the sleeve member comprises two axially separated portions; a metallic portion and a compressible resilient portion, with which compressible resilient portion the locking elements engage. This allows for ease of construction of the sleeve member. The locking elements and the fingers may be alternately disposed circumferentially around the second shaft. Also the sleeve member may be mounted on the second shaft and the fingers may be coupled to, or formed from, a ring element which is mounted on the first shaft.

Preferably the locking ring is maintained stationary relative to rotation of either the first or second shaft and to movement of the fingers or locking elements. The compressible resilient material may be a rubber. The present invention will now be explained, by way of example only and with reference to the accompanying drawings of which:

Figure 1:
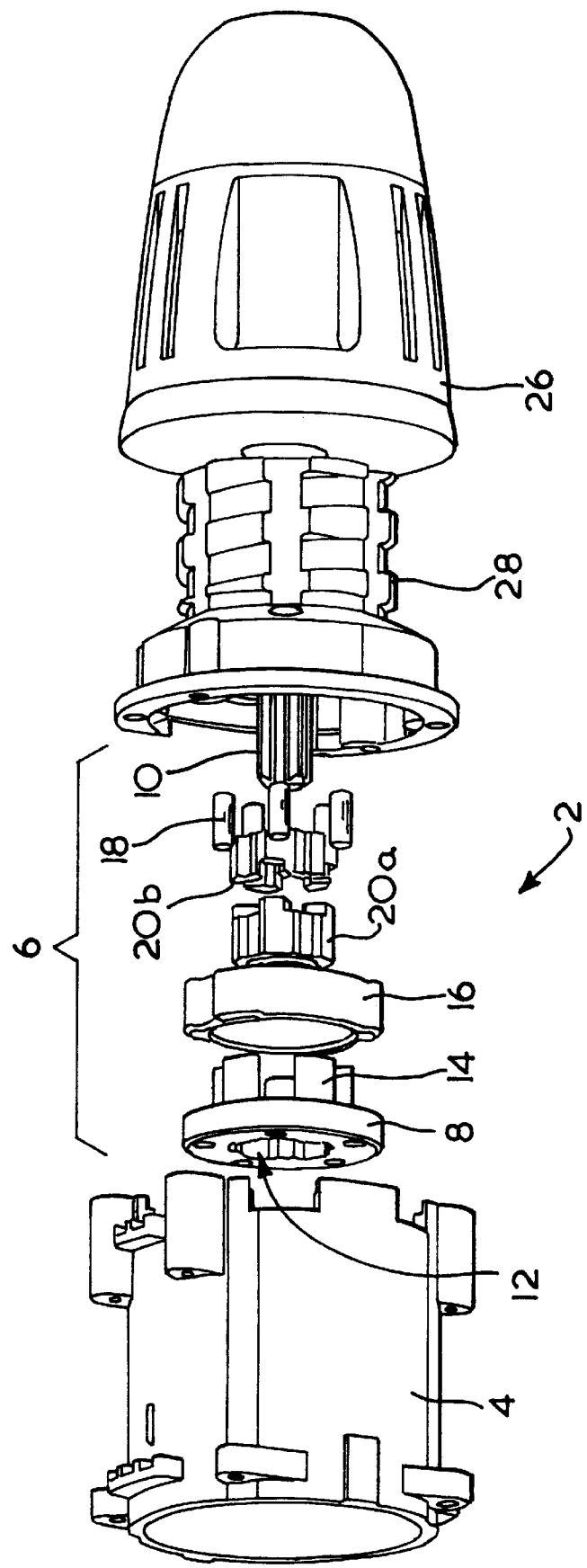
FIG. 1 illustrates an exploded view of part of a power tool incorporating a shaft locking device in accordance with the present invention.

A description of the way in which shaft locks in general function will not be given herein as this will be readily apparent to a practitioner skilled in the art. However, the teachings of both prior art references, namely U.S. Pat. No. 5,016,501 and U.S. Pat. No. 3,243,023 are incorporated by reference herein as examples of such general function of shaft locks.

Referring to the figures; it can be seen that the output mechanism of a power drill, shown generally as 2, comprises a motor 4 which drives a first shaft of the one-way transmission means 6. In this example the first shaft is drive carrier 8. Through the centre of drive carrier 8 passes a second shaft, here output spindle 10. The output spindle 10 is splined to be received within a correspondingly shaped cut-out 12 within the drive carrier 8.

Coupled to the drive carrier 8 and radially disposed therearound is a drive means comprising a plurality of fingers 14 which extend longitudinally with respect to the rotational axis of the drive carrier 8. Circumferentially around the fingers 14 of the plurality is a locking ring 16. Circumferentially disposed around the inner periphery of the locking ring 16 are the plurality of locking elements, here rollers 18. The rollers 18 and fingers 14 are arranged alternately as can be seen from FIG. 2. The output spindle 10 is splined and passes through a correspondingly shaped hole in a sleeve member 20. In the example shown, the sleeve member 20 is formed in two parts and this will be further described below.

Figure 2:
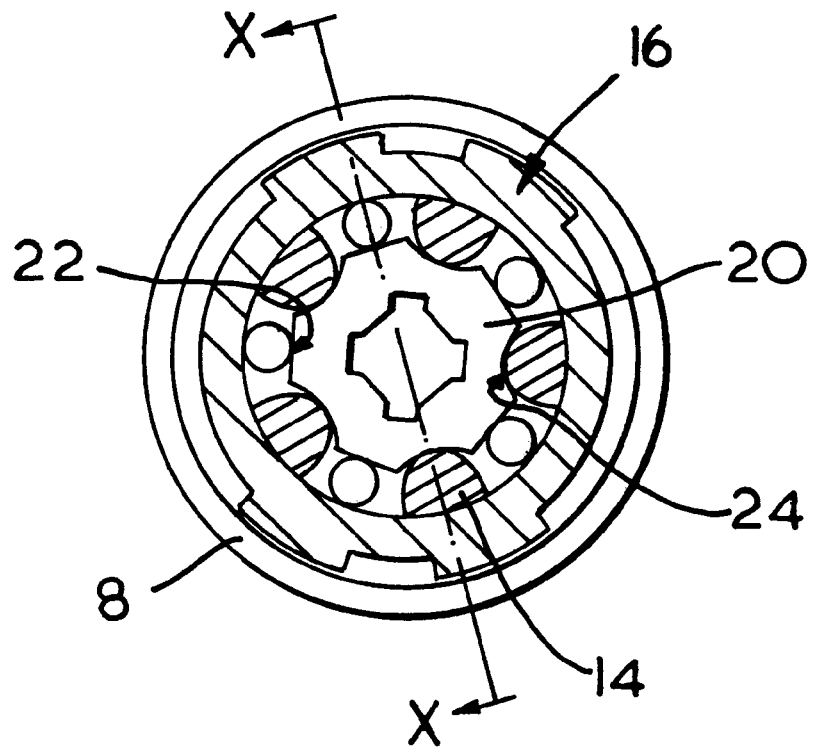
FIG. 2 illustrates a schematic sectional view of the one-way transmission means of FIG. 1.

As can be seen from FIG. 2, the outer surface of the sleeve member 20 is arranged to include a plurality of either straight or convex portions 22 adjacent each of the plurality of rollers 18 and a plurality of furrow, or concave portions 24 adjacent each finger 14.

In operation of the device 2, rotation of the drive carrier 8 causes rotation of each of the fingers 14. Due to a degree of clearance between each finger 14 and their corresponding concave portions 24, the fingers are able to push that roller 18 immediately ahead of that finger with respect to the direction of movement of the finger. It can also be seen from FIG. 2 that, due to the above noted clearance between each finger 14 and the concave portion 24 of the sleeve member 20, the peripheral shape of the fingers 14 is such that their convex edges are able to contact the rollers 18 (in whichever direction the fingers are rotated) before the finger 14 engages with the sleeve 20 at the concave portions 24. This action of pushing each roller 18 ahead of its adjacent and driving finger 14 causes the roller to be held between any two adjacent concave portions 24 and thus the fingers also urge the sleeve 20 to rotate due to the contact between the fingers 14 and the sleeve 20 at those points where they engage, namely the concave portions 24. In this manner, rotation of the drive carrier 8 causes rotation of the sleeve 20 and thus also the output spindle 10 by preventing wedging of the rollers 8. Rotation of the output spindle 10 causes rotation of chuck 26 via a clutch mechanism 28, as is conventional in power drills.

Figure 3:
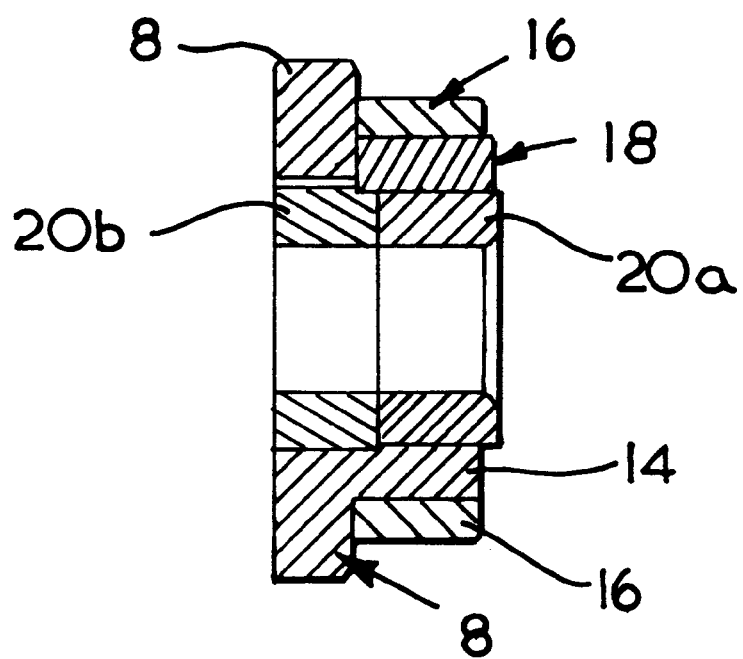
FIG. 3 illustrates a section taken along the line x—x of FIG. 2.

Considering now rotation of the chuck 26 and hence output spindle 10. This causes torque to be applied to the sleeve 20 and thus the convex portions 22 and that part of locking ring 16 in contact with each roller 18. Thus no rotation is imparted to the fingers 14 or drive carrier 8. The above is conventional operation for a one-way transmission means forming part of a shaft-locking device. From FIGS. 1 and 3 it can be seen that the sleeve 20 is formed in two inter-engaging portions. A metal portion 20*a* is connected to a compressible resilient portion, in this example a rubber portion 20*b* formed from Nitrile NBR. Seen particularly from FIG. 3, the rubber portion 20*b* is formed oversize as compared to the metallic portion 20*a*. This enables the rubber portion 20*b* to contact each roller 18 slightly in advance of the metallic portion (due to the compression of the Nitrile NBA material) and thereby damp the contact between the sleeve 20, rollers 18 and (if any such contact occurs, fingers 14) locking ring 16. This aids to minimise any contact noise between these components.

It will be appreciated by those skilled in the art that forming the sleeve 20 in two portions need not be necessary. Equally efficient would be to coat the sleeve 20 in a compressible resilient material. There would still then be contact with, for example, Nitrile NBR ahead of the metallic contact within the body of the sleeve 20. The whole of the sleeve 20 could be coated, or only a small part, be this in an arcuate or annular portion.

It will be understood that references to shafts are apt to cover drive rings and any mechanical component capable of imparting or receiving torque or rotational movement.

It will also be apparent that both or either of the drive carrier 8 (and also the fingers 14) and the sleeve 20 may be formed integrally with their respective driving or driven shafts.

I claim:

1. A shaft locking device comprising:
    a first shaft;
    a second shaft coaxial to the first shaft;
    a one way transmission connected between the first and second shafts and permitting rotation of the second shaft when torque is applied to the first shaft and preventing rotation of the second shaft and the first shaft when torque is applied to the second shaft;
    the transmission comprising:
        a locking ring;
        a sleeve member with a first exterior surface portion thereof formed of a compressible resilient material and a second exterior surface portion thereof formed of a non-compressible material;
        a plurality of locking elements circumferentially sandwiched between the locking ring and sleeve member and tending to wedge into static engagement with the locking ring when the sleeve member is driven by the second shaft;
        a drive comprising a plurality of fingers longitudinally extending along the rotational axis of the first shaft; and
        the fingers are interposed with the locking elements and circumferentially sandwiched between the locking ring and sleeve member such that the fingers are driven by the first shaft to act upon the locking elements to prohibit static engagement of the locking elements with the locking elements.

2. The device of claim 1, wherein the compressible, resilient material is formed as a coating on the first exterior surface portion of the sleeve member.

3. The device of claim 1, wherein the sleeve member comprises two axially separated portions; a metallic portion, which includes the second exterior surface portion, and a compressible resilient portion, which includes the first exterior surface portion and with which compressible resilient portion the locking elements engage.

4. The device of claim 1, wherein the locking elements and the fingers are alternately disposed circumferentially around the second shaft.

5. The device of claim 1, wherein the sleeve member is mounted on the second shaft.

6. The device of claim 1, wherein the first shaft is a ring element and the fingers are coupled to the ring element.

7. The device of claim 1, wherein the first shaft is a ring element and the fingers are formed from the ring element.

8. The device of claim 1, wherein the locking ring is maintained stationary relative to rotation of either the first or second shaft and to movement of the fingers or locking elements.

9. The device of claim 1, wherein the compressible resilient material is a rubber.

10. The device of claim 1, wherein the locking elements are selected from the group of rollers and balls.

11. The device of claim 1, wherein the device is a power tool, which further comprises:

a motor;

a driven element; and means for coupling the motor to the driven element whereby the driven element is operated upon operation of the motor.

12. The device of claim 1, further comprising:

the sleeve member is formed by a first sleeve portion and a second sleeve portion; and the first sleeve portion is oversize compared to the size of the second sleeve portion.

13. The device of claim 12, wherein the first sleeve portion includes the first exterior surface portion.

14. The device of claim 1, further comprising:

one of the sleeve member, locking elements, drive, and locking ring comprising compressible resilient material.

* * * * *